US007324221B2

(12) United States Patent

Kelleher et al.

(10) Patent No.: US 7,324,221 B2
(45) Date of Patent: Jan. 29, 2008

(54) METHOD FOR PRINTING MULTIPLE JOBS

(75) Inventors: Denis Kieran Kelleher, Palm Harbor, FL (US); Bradley D. Kent, Palm Harbor, FL (US); Warren G. Cohn, Oldsmar, FL (US)

(73) Assignee: SmartMix Technologies, LLC, Palm Harbor, FL (US)

( * ) Notice: Subject to any disclaimer, the term of this patent is extended or adjusted under 35 U.S.C. 154(b) by 946 days.

(21) Appl. No.: 10/375,445

(22) Filed: Feb. 27, 2003

(65) Prior Publication Data

US 2004/0085580 A1 May 6, 2004

Related U.S. Application Data

(60) Provisional application No. 60/424,096, filed on Nov. 6, 2002.

(51) Int. Cl.
*G06F 3/12* (2006.01)
*G06K 15/00* (2006.01)

(52) U.S. Cl. .................................... 358/1.13; 358/1.14

(58) Field of Classification Search ............... 358/1.15, 358/1.18, 1.1, 1.14; 705/408
See application file for complete search history.

(56) References Cited

U.S. PATENT DOCUMENTS

| | | | | |
|---|---|---|---|---|
| 4,831,554 | A | 5/1989 | Storace et al. | |
| 5,039,075 | A | 8/1991 | Mayer | |
| 5,819,241 | A | 10/1998 | Reiter | |
| 6,141,654 | A | 10/2000 | Heiden et al. | |
| 6,154,733 | A | 11/2000 | Pierce et al. | |
| 6,173,274 | B1 | 1/2001 | Ryan, Jr. | |
| 6,178,411 | B1 | 1/2001 | Reiter | |
| 6,327,580 | B1 | 12/2001 | Pierce et al. | |
| 6,408,286 | B1 | 6/2002 | Heiden | |
| 6,762,384 | B1 * | 7/2004 | Kechel | 209/584 |
| 7,133,851 | B1 * | 11/2006 | Benson | 705/410 |

* cited by examiner

*Primary Examiner*—Douglas Q. Tran
(74) *Attorney, Agent, or Firm*—James H. Beusse; Beusse Wolter Sanks Mora & Maire, P.A.

(57) ABSTRACT

A system and method for merging and printing multiple postal presorted print jobs into a single print run for discounted rate mailing. The method includes merging mail recipient address lists from several print job orders into a merged recipient address list. The method further includes associating printing content provided by a print job order requestor with each recipient in the merged mail recipient address list. The method also includes printing mailpieces in a presorted sequence by selectively applying associated printing content for each mail recipient in a presorted merged mail recipient address list. Accordingly, several small targeted mailing print jobs, each individually too small to qualify for mailing discounts, can be merged into a larger, presorted print run collectively eligible for mailing discounts.

12 Claims, 4 Drawing Sheets

| FIG. 3A |
|---|
| FIG. 3B |

METHOD FOR PRINTING MULTIPLE JOBS

CROSS REFERENCE TO RELATED APPLICATIONS

This application claims priority to a provisional application filed on Nov. 6, 2002 having application No. 60/424,096, the specification of which is incorporated herein by reference.

BACKGROUND OF THE INVENTION

1. Field of the Invention

The present invention relates to a printing method, and more particularly, to a method of arranging multiple print jobs to allow printing of the multiple print jobs in a single run.

2. Related Art

With the advent of advanced computers and printing techniques, the cost of custom printing, particularly for advertising, has become more cost effective for smaller merchants. However, despite technological advances in the physical printing process, each print job, regardless of the size of the job, requires considerable set up time. In the case of large print jobs, the cost associated with set up is small compared to the overall coast of the job, due, in part, to economies of scale. In the case of relatively small print jobs however, the cost associated with set up becomes an increasingly higher percentage of the overall cost. Accordingly, at a certain job size, the cost of the print job set up becomes prohibitive compared to the actual cost of the printing. Thus, despite increasingly efficient printing techniques, the higher marginal costs of small print jobs continue to be a problem in the printing industry, especially in the area of targeted advertising.

While marketing may be accomplished by mass mailing of advertising literature, sophisticated data information collection schemes have made it more cost effective to target mailings to consumers who are most likely to respond to the advertisement. However, smaller merchants may have a limited advertising budget and a relatively small geographic marketing area as compared to larger, nationwide merchants. As a result, many smaller merchants cannot afford to use targeted mailings because of the high set up costs involved in printing a small job.

In addition to printing costs, mailing costs can also be prohibitively expensive for smaller merchants using targeted mailing. Notably, bulk mail quantities less than 200 mailpieces do not currently qualify for mailing discounts. One way to reduce postal costs is to provide the post office with mail pieces presorted by 3 digit sectional center facility (SCF) (the first three digits that indicate a postal facility that serves and the processing and distribution center for post offices in a designated geographic area), zip code, or by carrier route. Postal presorting refers to the process by which a mailer groups mailpieces by ZIP Code so that the mailpieces are sorted to the finest extent possible required by standards for which a specific mailing rate is claimed. Generally, presort is performed sequentially, from the lowest (finest) level to the highest level, to those destinations specified by the applicable standard and is completed at each level before the next level is prepared. Postal presorting with respect to postal recipient addresses involves physically separating mailpieces based on minimum qualifying quantities for a given classification of mail, such as carrier route (the addresses to which a mail carrier delivers mail), 3 digit (SCF) 5 digit ZIP code, a destination designation scheme, an automated area distribution center designation (AADC), or a mixed AADC groups. The more specific presorting of mail a sender can perform, the larger the discount. For example, a bulk mailing sorted by ZIP code receives a larger discount than a mailing presorted by SCF. Most importantly, there are minimum quantities required for a single job to qualify for discounted rates. For discounted standard mail, the mailing must contain a minimum of 200 mailpieces with at least 150 to a single 3 digit SCF postal region. For discounted first class mail, the mailing must contain at least 500 mailpieces with at least one full tray of 3 digit sorted mailpieces. Consequently, smaller merchants rarely can take advantage of the postage discounts afforded larger merchants because the quantity of the smaller merchants' custom mailpieces is often below the minimum thresholds set by the Post Office.

During printing of mailpieces, databases, postal hygiene software, and postal presorting software can be used to automatically presort in a computer and then print the mailpieces in sortation sequence ready to be bundled with the same presort group, such as SCF, Zip code, or carrier route. However, this method works best for volume runs. Small print jobs that would not normally qualify for discounts typically require mailing at a full first class rate and manual application of stamps. Alternatively, a batch of small jobs can be printed separately and combined, then presorted into appropriate ZIP code bins. Mail presorting facilities and mail presorting equipment can be used to presort mail, but these solutions can be prohibitively expensive, requiring costly mechanical automated equipment or extensive manual labor.

To qualify for bulk mailing discounts, mailpieces must be Coding Accuracy Support System (CASS) certified before mailing. CASS is a system designed to check the integrity of addresses within the United States. When an address passes through the CASS, it is verified against a database containing a comprehensive list of mailing address in the United States. This address database is issued by the USPS and is updated bimonthly. If an address passes this verification, four digits are appended to the end of the five digit ZIP code and three extra digits (a delivery point code) are added to a separate field created in the database. Additional information is also added to several other fields within the database for use by other software that sorts the addresses according to United States Postal Service (USPS) regulations for postal discounts. Both CASS certification and presort processing are required to take advantage of discounts offered by the USPS, and these savings can be significant. For instance, a letter that normally would cost $ 0.37 to mail, could cost as little as $0.174 by taking advantage of CASS and presorted bulk mail discounts. Furthermore, by bar-coding mailpieces, manual handling of mail and the associated costs are reduced. Normally, when a piece of mail enters the Post Office, it may be manually processed many times before being processed further by automated machinery for mailing. The same piece of mail, when bar-coded and presorted according to Post Office guidelines, can avoid most of the manual processes and several of the automated processes as well.

Accordingly, there is a need to provide a method for more economical printing of small print jobs by reducing the set up time for the job. In particular, there is a need to be able to process multiple print jobs in a single print run and allow the content of each page printed in the run to differ by as much as 100%. Further, there is a need to provide an efficient method of combined presorting of multiple different mail jobs during the computer preparation of these jobs such that they could be printed sequentially in presort sequence so that the different mail runs become a physical single job with appropriate mailing discounts and volume economies as the job exits the printing machine.

SUMMARY OF THE INVENTIOIN

Generally, the present invention fulfills the foregoing needs by providing, in one aspect thereof, a method for merging and printing multiple postal presorted print jobs into a single print run for discounted rate mailing. The method further includes merging mail recipient address lists from a plurality of print job orders into a merged recipient address list. The method also includes associating printing content with each recipient in the merged mail recipient address list. The method further includes printing mailpieces in a presorted sequence by selectively applying associated printing content for each mail recipient in a presorted merged mail recipient address list.

In addition, the present invention provides, in another aspect thereof, a printing method for merging print jobs. The method includes receiving and maintaining a list of mailing recipients comprising addresses. The method also includes receiving a plurality of print job orders from senders, each order comprising unique print content and desired recipients. In addition, the method includes tagging recipients in the list of mailing recipients with a unique code corresponding to the desired recipients indicated in each of the print job orders to uniquely associate each sender with the desired recipients. The method further includes merging each of the print job orders into a merged print job and presorting the merged print job into a postal presorted print run according to the addresses of the combined mailing recipients. In addition, the method includes associating the print content received from each sender with each recipient tagged with the corresponding sender's unique code. The method further includes inserting the appropriate content in the postal presorted print run so that the print jobs orders are printed in a postal presorted sequence corresponding to the addresses of the mailing recipients.

The present invention further provides, in another aspect thereof, a computer system for merging and printing multiple postal presorted print jobs into a single print run for discounted rate mailing. The system further comprises a processor, for executing stored instructions and a storage device, coupled to the processor, for executing stored instructions to merge and print postal presorted print jobs.

BRIEF DESCRIPTION OF THE DRAWINGS

The features of the invention believed to be novel are specifically set forth in the appended claims. The features and advantages of the present invention will become apparent from the following detailed description of the invention when read with the accompanying drawings in which:

Figure 1:
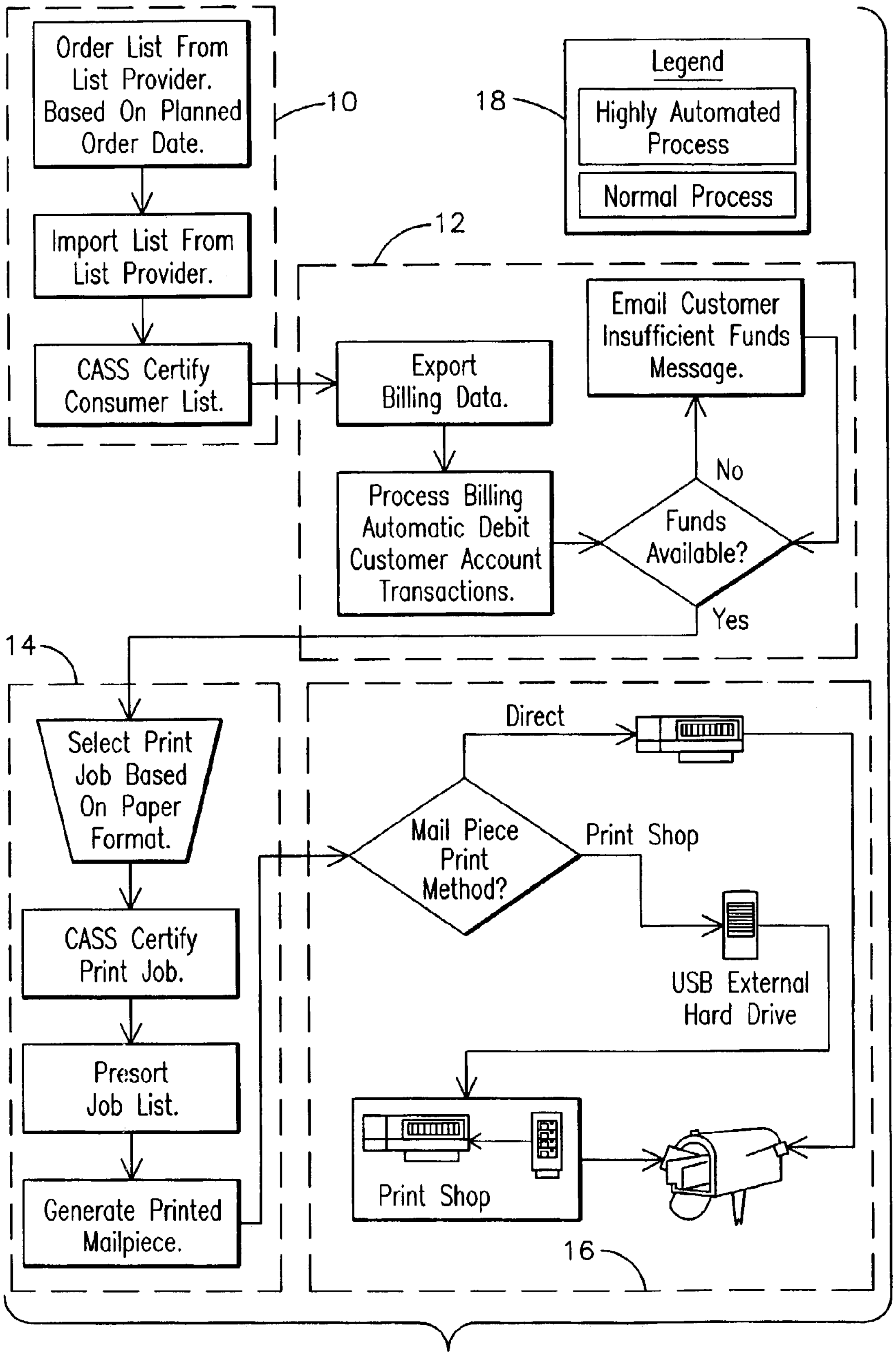
FIG. 1 illustrates a flow chart describing a business process employing the printing method of the invention.

In certain situations, for reasons of computational efficiency or ease of maintenance, the ordering of the blocks of the illustrated flow chart could be rearranged or moved inside or outside of the illustrated loops by one skilled in the art. While the present invention will be described with reference to the details of the embodiments of the invention shown in the drawing, these details are not intended to limit the scope of the invention.

DETAILED DESCRIPTION OF THE INVENTION

FIG. 1 illustrates a flow chart describing a business process employing the printing method of the invention. Generally, the business process includes receiving order lists from customers 10, processing billing information 12, setting up the print run 14, and printing and mailing the order 16. The process advantageously allows multiple small print runs to be merged and sorted so that that no post-printing sorting is required to qualify for postal discounts. By associating common recipient addresses among a multitude of print job orders and merging the print jobs orders into a single print run so that the print jobs orders are printed in a sequence corresponding to the common address, printing and sorting can be accomplished in one step.

Order lists provided by or acquired for mail sender customers, can include, for example, the following fields: name, address, city, state, zip, and a predetermined sender keycode. In an aspect of the invention, each order list is associated with a unique sender. A sender keycode contains a value that is unique to the sender and identifies the intended recipient records (for example, stored in a database and provided by the sender) as being the recipients who will receive a mailpiece from the sender corresponding to the keycode. Advantageously, most of the processes can be automated, primarily using software and computer technology, as indicated with reference to legend 18. At the heart of the invention is the process of setting up the print job 14 to incorporate a variety of individual job requests received from senders, which is more fully described with respect to FIGS. 2 and 3.

Figure 2:
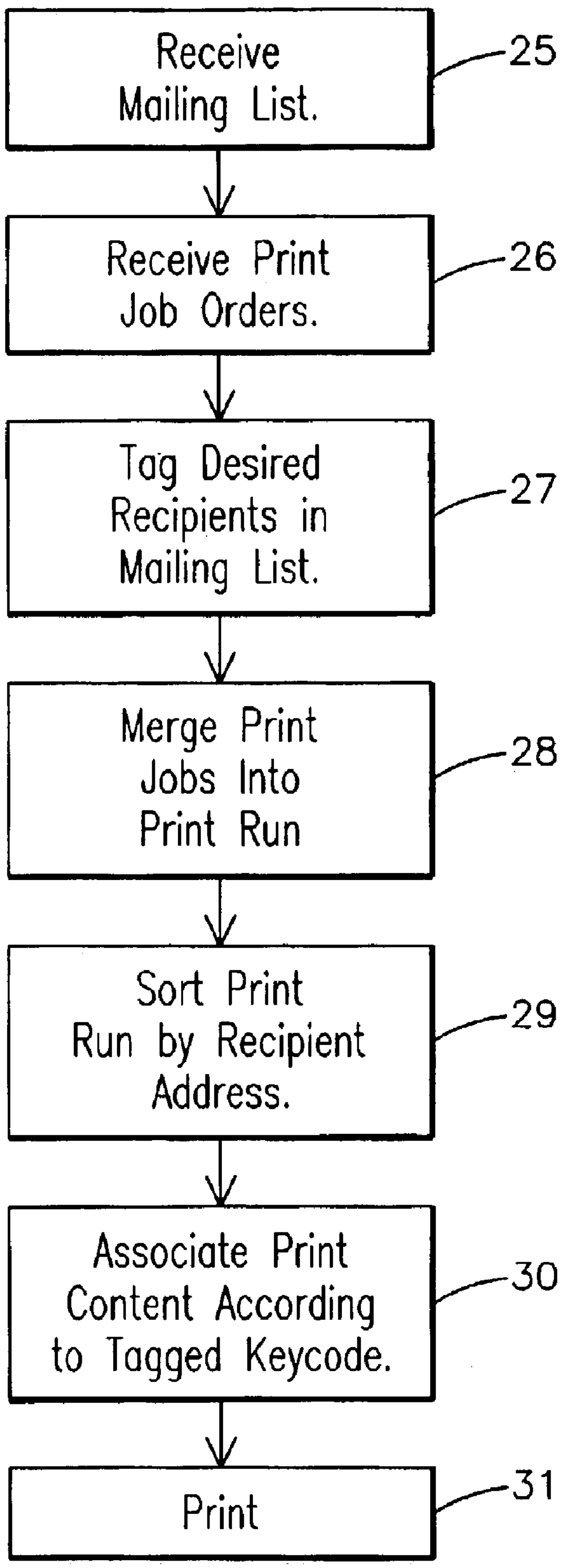
FIG. 2 illustrates a flow chart describing the printing method for reducing print set up time for small print jobs and eliminating the need for physical post-print presorting of small run mailpieces.

FIG. 2 illustrates a flow chart describing setting up a print run comprising print jobs based on order lists. Generally, the method includes receiving recipient mailing lists and sender print job orders and assembling a print run by merging many small print jobs to achieve (common postal destination) groups of printed mailpieces large enough to qualify for postal discounts. The recipient data typically may have a sender keycode field with the same data throughout. Alternatively, if the recipient data does not include a keycode data, a unique sender keycode can be applied.

Multiple mailings from different senders can then be grouped together according to destination addresses of the mailpieces in a postal presorted print run to allow application of bulk discounts. For example, if there are 150 mailpieces to be mailed to ZIP code 34685, the system will automatically group the 150 mailpieces together in a postal presort group to allow application of presorting to a 5 digit ZIP code. In another example, if there are 45 mailpieces to be mailed to ZIP code 34685, 35 mailpieces to be mailed to ZIP code 34684, and 100 mailpieces to be mailed to ZIP code 34683, then the system would group the total of 180 mailpieces in a postal presort group for SCF 346 because none of the constituent groups has more than 150 mailpieces going to same ZIP code, and only an SCF discount would apply for the 180 piece postal presort group.

The postal presorted mailpieces are then printed with the appropriate printed content applied from each of the senders according to the keycode. Thus, the order of printed content applied to a mailpiece is not determined by the content as in conventional high volume mailpiece printing techniques, where the same basic template or form content is printed for consecutive presorted recipients. Rather, in an aspect of the invention, the printed content is applied according to the sender keycode associated with the consecutive presorted recipients, so that the printed content may change entirely for each mailpiece in a print run, thereby enabling multiple job printing and sorting to be performed simultaneously.

As shown in FIG. 2, the general process of printing and sorting includes receiving a list of mailing recipients 25, having a mailing address associated with the recipient. For example, the list may be a target list for direct mail advertising provided by a printing client. The list may be maintained in a database for future reference, or the sender may send a new mailing list with each print job order. In another embodiment, lists can be purchased or leased based on individual, building (such as home or commercial building), or geographic parameters. In an aspect of the invention, a multitude of mailing lists are maintained. Next, print job orders, such as advertising flyers to be mailed to recipients, are received 26 from senders. The print job order includes, for example, print content, desired recipients of the print content, and the desired delivery date. If a list of mailing recipients is purchased or leased, then the order of steps 25 and 26 are reversed—a print job order is received and then applied to a desired list of purchased or leased mailing recipients.

The desired recipients of the printed mailpieces are tagged 27 with a keycode as being recipients of the corresponding sender specific mailpieces. After several print jobs have been received (generally, small print jobs that are too small to qualify for discounted mailing rates and would ordinarily need to be mailed at a full, undiscounted rate) and the appropriate recipients tagged with keycodes, the individual print jobs are merged into a print run 28. Merging the print runs allows creation of a large list that advantageously includes sufficient quantities of mailpieces for various postal destinations, such as SCF or ZIP code, to qualify for bulk mailing.

The print run is then presorted according to the tagged recipients' addresses 29, so that the run is in postal presort order. After sorting, the print content provided by the senders is associated to each of the recipients according to the keycodes 30, and the print run can then be printed 31. Accordingly, the recipients within the plurality of combined small print job orders are printed in a postal presort sequence, advantageously qualifying for significant postal discounts and mail shop economies of finishing volume jobs. For example, finishing may include trimming, cutting, folding, gluing, inserting or other paper finishing operations.

Figures 3, 3A:
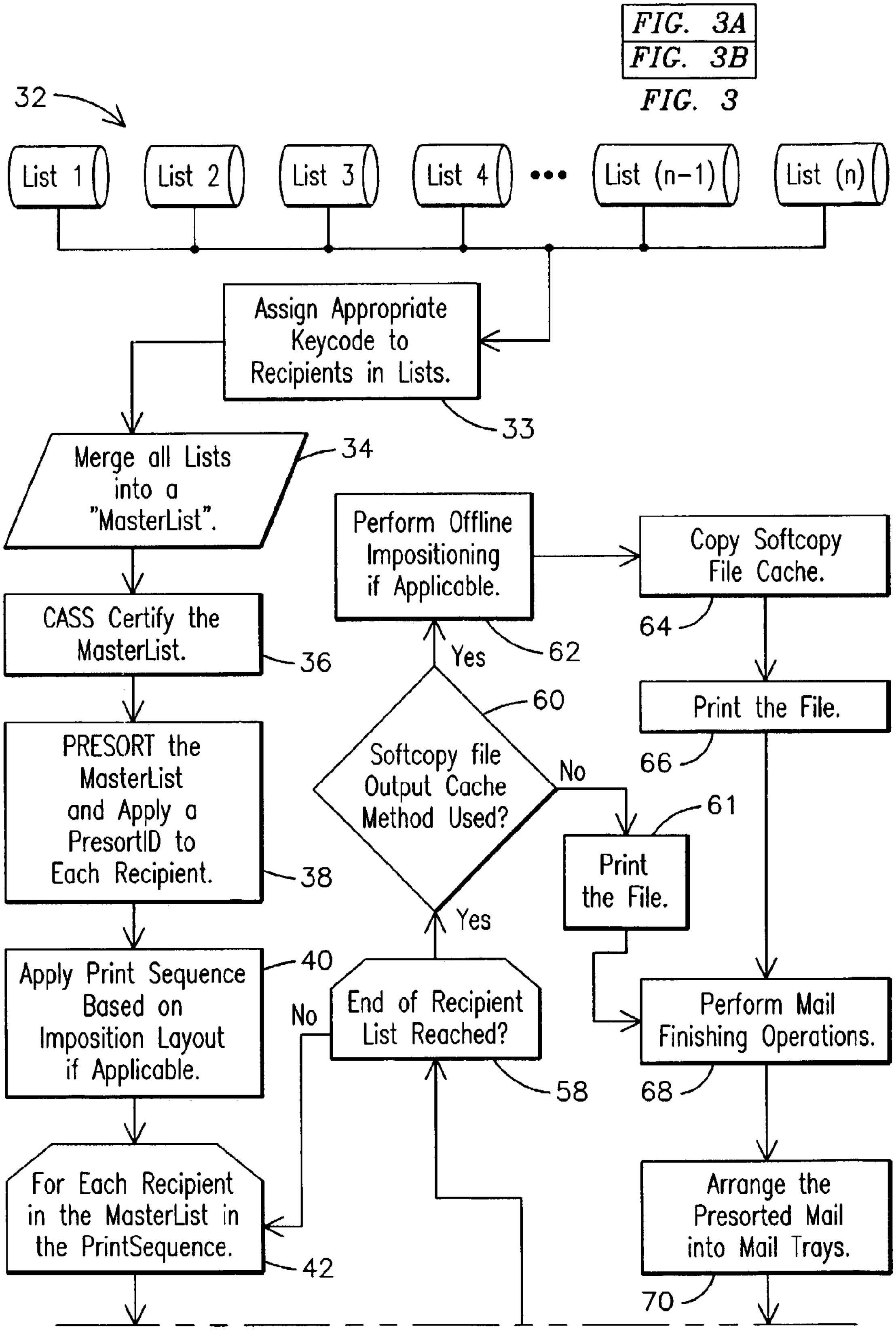
FIG. 3, collectively including the partial views
FIGS. 3A and 3B, illustrates a detailed flowchart further describing the printing method illustrated in FIG. 2.
Figure 3B:
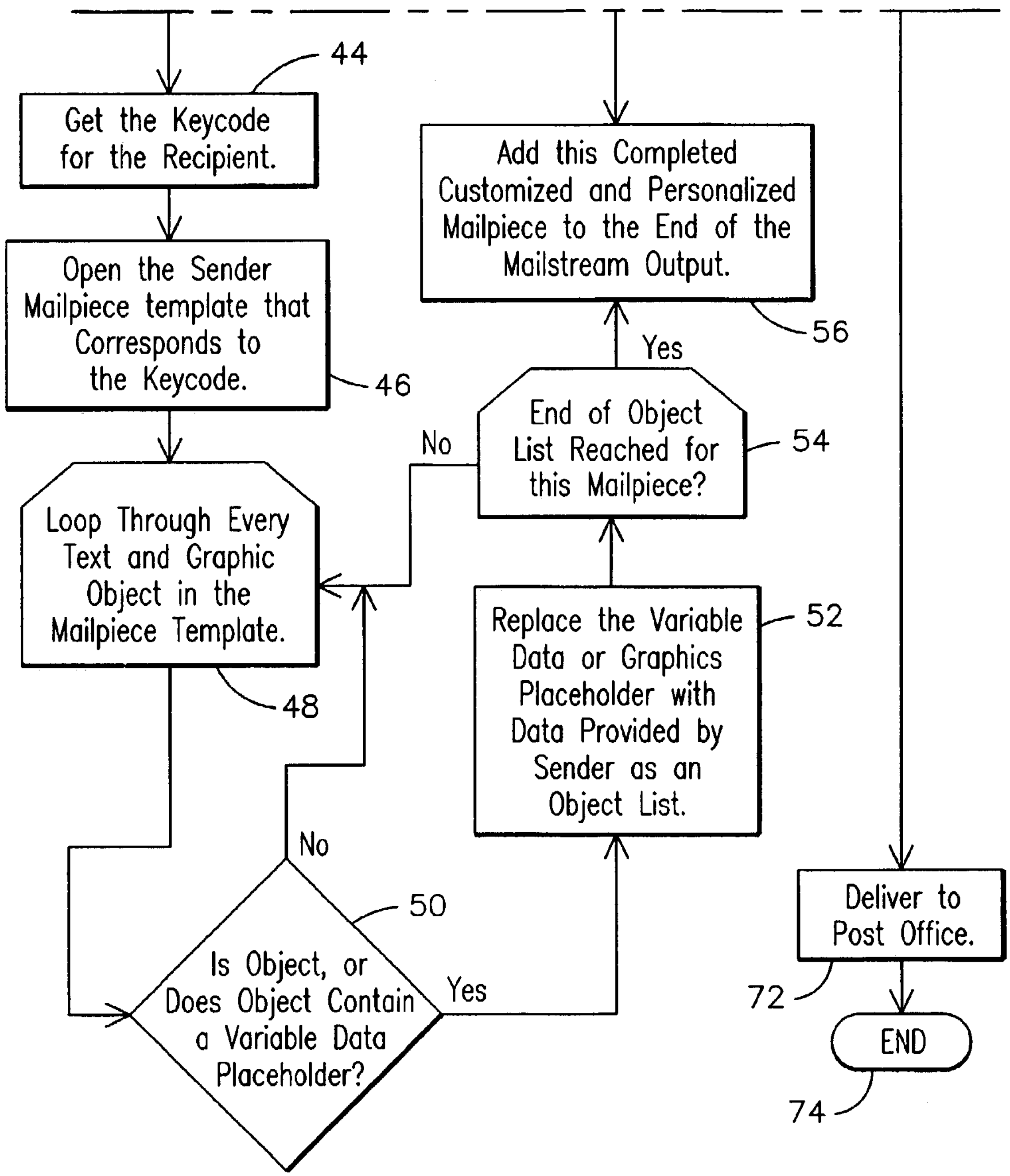

FIG. 3 illustrates a detailed flowchart further describing the printing method for reducing print set up time for small print jobs. The process allows merging of individual print jobs from a variety of printing clients, or senders, into a single print job having a single set up time associated with the merged job. Accordingly, the process provides more economical printing of small print jobs by effectively reducing the set up time for each individual job. Furthermore, the process merges multiple print jobs in a single print run by innovatively allowing the content of each page printed in the run to differ by as much as 100%. In an aspect of the invention, the process also automatically computes impositions so that mailpieces are printed in a presorted order.

Generally, the detailed process includes accessing mailpiece order lists, merging the lists, presorting the merged lists, applying print sequences to the mailpieces based on imposition (arrangement/ordering of pages for printing multiple final pieces on one large sheet of paper to reduce paper/printing costs so that when the printed stack is cut, the stacks of finished mailpieces are in postal presort order) if required, applying a keycode to each recipient, replacing placeholder data, personalization, and creating a mailpiece print file comprising a variety of individually customized print jobs.

More specifically, as shown in FIG. 3, sender requests are accessed from order lists 32 stored in a database. In an aspect of the invention, a requested mailpiece intended for a respective recipient may be processed as a template having customizable printing fields, such as test of graphic objects, so that custom print content can be printed for each respective print run. Each recipient in the list is assigned a keycode 33 corresponding to the sender that requested the respective recipient. The individual print jobs are then merged into a master list 34 and the master list created in step 34 is CASS certified 36. The master list is then presorted according to the desired recipients of the mailing 38, and a presort ID is automatically attached to each recipient, for example, by presorting software. Typically, the presort ID starts at a value of zero and is incremented until the master list is completely presorted. The largest presort identifier value in the presorted list is N−1, where N is the number of CASS certified records in the master list. The presort identifier is used to sort and print Next, a print sequence is applied to the master list corresponding the presort identifier and based on an imposition layout, if applicable 40.

An iterative loop is then performed for each recipient in the master list 42 of the print sequence created in step 40 and the presort order created in step 38. For each recipient, the keycode for the recipient is retrieved 44, a copy of a sender mailpiece template (including, for example, text and graphic placeholders) corresponding to the keycode is opened 46. An iterative loop examining each text object and graphic object placeholder in the mailpiece template is performed 48. If an object is, or contains, a variable data placeholder 50, then the variable data or graphics placeholder is replaced with the corresponding data provided by the sender, for example, in an object incorporated into the sender's order list 52, This process continues until the end of the object list for the current mailpiece is reached 54. If an object is not a variable data placeholder in step 50, the process returns to step 48 and the next object is examined.

After the end of the object list for the current mailpiece is reached in step 54, the customized and personalized mailpiece is added to the end of the mailstream output 56, and the iterative process of step 42 repeated until the end of the recipient list 58 is reached. After the end of the recipient list is reached in step 60, the type of desired output is determined 60. If softcopy file output is desired, offline imposition is performed if applicable. Then, the softcopy file is saved to appropriate storage media (such as a firewire or USB portable computer hard drive) and the softcopy file can be delivered to a printing facility, for example, and printed 66. If direct printing is desired, the file is printed 61 and mail finishing operations are performed 68. In addition, files printed using the softcopy file output cache method are further processed by the mail finishing operations of step 68. After the mail finishing operations are performed, the presorted, finished mailpieces can be arranged into mail trays 72 and delivered to the post office 72 where the process ends 74.

Accordingly, several jobs for a printing run can be set up simultaneously, so that only one set up procedure is required for a run of several jobs. The process automatically merges the jobs, assembles the required ad copy, presorts the mailpieces, and calculates imposition to provide a print run that is presorted and ready to mail. For example, an individual recipient in a mail list merged according to the invention may be receiving mailpieces from three different senders. Using conventional printing techniques, three separate print runs with printing template changes between runs, and manual presorting after the run, would be required to take advantage of presorted mail discounts. Advantageously, by merging and presorting lists from several vendors, and the mailpieces from the three senders to the individual recipient may be printed sequentially by changing printing templates "on the fly" for each of the three mailpieces, thereby preserving the presort order and eliminated the need to have three separate print runs and post printing presorting. Accordingly, the mailpieces are sorted prior to the printing process so that no manual sorting is required before delivering the print job to the post office. As a result, discounted bulk mail rates can be used. By merging print jobs, smaller jobs having less than 200 presorted mailpieces, for example, (under current USPS rules, an amount too small to qualify for bulk mailing rates), can still take advantage of bulk mailing rates by being incorporated into a job having more that 200 total pieces.

In addition, the invention provides imposition so that print sequencing can be maintained. As an example, when a mailpiece is being printed as a single of 1-up positions, the print sequence order is the same as the mailing presort order. However, to maximize printing economies, mailpieces, especially small items such as postcards, are sometimes printed in impositioned format. For example, a postcard may be printed 4-up on letter-sized paper. Using the disclosed process, the print order is configured so that when printing is complete and the stack of printed sheets are cut into the 4 stacks of cards, each stack is already in mailing presort order and the total number of items on the mailing list is included.

The present invention can be embodied in the form of computer-implemented processes and apparatus for practicing those processes. The present invention can also be embodied in the form of computer program code containing computer-readable instructions embodied in tangible media, such as floppy diskettes, CD-ROMs, hard disks, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose computer, the computer program code segments configure the computer to create specific logic circuits or processing modules.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A method for merging and printing multiple different postal presorted print jobs into a single print run for discounted rate mailing comprising:

merging mail recipient address lists from each of a plurality of different print job orders, each of the different print job orders having a different printing content, into a merged mail recipient address list;

associating printing content from each of the print job orders with corresponding recipients based on the merged mail recipient address list associated with the print job orders for the printing content; and printing mailpieces that include printing content from all of the print job orders in a single print run combining the plurality of different print job orders in a presorted sequence by selectively applying associated printing content for each mail recipient in a presorted merged mail recipient address list so that no further sorting is necessary after printing.

2. The method of claim 1, further comprising maintaining an address list of mail recipients.

3. The method of claim 2, further comprising maintaining a list of mail senders requesting print job orders.

4. The method of claim 1, further comprising assigning a unique code to a mail sender requesting a print job.

5. The method of claim 4, further comprising associating the unique code with recipients in a mail recipient address list according to desired recipients indicated in a print job order received from a mail sender.

6. The method of claim 4, further comprising receiving print content from a mail sender and associating the print content with the mail sender's unique code.

7. The method of claim 6, further comprising inserting the print content into a mailpiece according to the corresponding unique code associated with desired recipients.

8. The method of claim 1, further comprising processing each mailpiece as a template comprising fields for inserting customized data or graphics when printing the mailpiece.

9. A printing method for merging multiple different print jobs into a single print run for discounted rate mailing comprising:

receiving and maintaining a list of mailing recipients comprising addresses;

receiving a plurality of different print job orders from senders, each of the different print job orders order-comprising different printing content and selected recipients of the different printing content;

tagging recipients in the list of mailing recipients with a unique code corresponding to the selected recipients indicated in each of the different print job orders to uniquely associate each sender with the selected recipients;

merging each of the different print job orders having different printing content into a merged print job;

presorting the merged print job into a single postal presorted print run combining the plurality of different print job orders having different printing content according to the addresses of the selected recipients;

associating the printing content from each of the print job orders received from each sender with corresponding selected recipients tagged with the sender's unique code; and inserting the appropriate printing content for each selected recipient in the postal presorted print run so that all of the print job orders are printed in a postal presorted sequence without a need for further sorting after printing.

10. A computer system for merging and printing multiple different postal presorted print jobs into a single print run for discounted rate mailing comprising:

a processor, for executing stored instructions; and a storage device, coupled to the processor, for executing stored instructions comprising:

a. receiving and maintaining a list of mailing recipients comprising addresses;

b. receiving a plurality of different print job orders from senders, each of the different print job orders order comprising different printing content and selected recipients of the different printing content;

c. tagging recipients in the list of mailing recipients with a unique code corresponding to the selected recipients indicated in each of the different print job orders to uniquely associate each sender with the selected recipients;

d. merging each of the different print job orders having different printing content into a merged print job;

e. presorting the merged print jobs into a single postal presorted print run combining the plurality of different print job orders having different printing content according to the addresses of the selected recipients;

f. associating the printing content from each of the print job orders received from each sender with corresponding selected recipients tagged with the sender's unique code; and g. inserting the appropriate printing content for each selected recipient in the postal presorted print run so that all of the print job orders are printed in a postal presorted sequence without a need for further sorting after printing.

11. The system of claim 10, comprising an address database, coupled to the processor, for storing a mailing recipient address list and corresponding address list codes for identifying each mailing recipient as a designated recipient.

12. The system of claim 10, further comprising a print content database, accessible by the processor, for storing print content submitted by senders.

* * * * *